(12) United States Patent
Allwood

(10) Patent No.: US 8,292,660 B2
(45) Date of Patent: Oct. 23, 2012

(54) CONSOLIDATION POINT ENCLOSURE

(75) Inventor: Brent David Allwood, Buttaba (AU)

(73) Assignee: ADC GmbH, Berlin (DE)

( * ) Notice: Subject to any disclaimer, the term of this patent is extended or adjusted under 35 U.S.C. 154(b) by 168 days.

(21) Appl. No.: 12/716,299

(22) Filed: Mar. 3, 2010

(65) Prior Publication Data

US 2011/0217867 A1   Sep. 8, 2011

(30) Foreign Application Priority Data

Mar. 3, 2009  (AU) ................................ 2009200824

(51) Int. Cl.
*H01R 13/60* (2006.01)

(52) U.S. Cl. ..................................... 439/540.1; 439/676

(58) Field of Classification Search ............... 439/540.1, 439/79, 676; 385/135
See application file for complete search history.

(56) References Cited

U.S. PATENT DOCUMENTS

| | | | |
|---|---|---|---|
| 5,199,878 A | 4/1993 | Dewey et al. | |
| 6,077,113 A * | 6/2000 | Lecomte | 439/540.1 |
| 6,086,415 A * | 7/2000 | Sanchez et al. | 439/540.1 |
| 6,186,798 B1 | 2/2001 | Follingstad et al. | |
| 6,345,986 B1 | 2/2002 | Follingstad et al. | |
| 6,347,715 B1 * | 2/2002 | Drozdenko et al. | 211/26 |
| 6,504,726 B1 | 1/2003 | Grabinger et al. | |
| 6,537,106 B1 | 3/2003 | Follingstad | |
| 6,600,106 B2 | 7/2003 | Standish et al. | |
| 6,608,764 B2 | 8/2003 | Clark et al. | |
| 6,623,278 B2 | 9/2003 | Follingstad et al. | |
| 6,736,670 B2 | 5/2004 | Clark et al. | |
| 6,761,585 B2 | 7/2004 | Clark et al. | |
| 6,818,834 B1 * | 11/2004 | Lin | 174/135 |
| 6,901,200 B2 | 5/2005 | Schray | |
| 6,916,199 B2 | 7/2005 | Follingstad | |
| 7,044,803 B2 | 5/2006 | Baker et al. | |
| 7,054,163 B2 | 5/2006 | Coffey | |
| 7,066,771 B2 | 6/2006 | Clark et al. | |
| 7,091,418 B1 | 8/2006 | Clark et al. | |
| 7,179,119 B2 | 2/2007 | Follingstad | |
| 7,200,929 B2 | 4/2007 | Coffey et al. | |
| 7,200,931 B2 | 4/2007 | Clark et al. | |
| 7,241,182 B2 | 7/2007 | Clark et al. | |
| 7,244,144 B2 | 7/2007 | Follingstad | |
| 7,311,550 B2 | 12/2007 | Hammond, Jr. et al. | |
| 7,316,586 B2 | 1/2008 | Anderson et al. | |
| 7,335,056 B1 | 2/2008 | Clark et al. | |
| 7,357,667 B2 | 4/2008 | Clark et al. | |
| 7,362,590 B2 | 4/2008 | Coffey et al. | |
| 7,367,850 B1 * | 5/2008 | Chang | 439/676 |
| 7,455,548 B2 | 11/2008 | Clark et al. | |
| 7,479,032 B2 | 1/2009 | Hoath et al. | |
| 7,493,002 B2 | 2/2009 | Coburn et al. | |
| 7,495,931 B2 | 2/2009 | Clark et al. | |
| 7,534,135 B2 | 5/2009 | Follingstad | |
| 7,544,090 B2 | 6/2009 | Follingstad | |
| 7,570,487 B2 | 8/2009 | Clark et al. | |

(Continued)

*Primary Examiner* — Hien Vu

(74) *Attorney, Agent, or Firm* — Merchant & Gould P.C.

(57) ABSTRACT

A consolidation point enclosure for a telecommunications network, including a base member for supporting the consolidation point on a mounting surface; and first and second bracket parts coupled to opposite end sections of a generally planar connection section of the base member, wherein the bracket parts are adapted to couple opposite ends sections of a patch panel to the base member so that a common insertion direction of modular jacks of the patch panel is substantially parallel to the generally planar connection section of the base member.

37 Claims, 7 Drawing Sheets

U.S. PATENT DOCUMENTS

| | | |
|---|---|---|
| 7,570,860 B2 | 8/2009 | Smrha et al. |
| 7,570,861 B2 | 8/2009 | Smrha et al. |
| 7,607,938 B2 | 10/2009 | Clark et al. |
| 7,627,221 B2 | 12/2009 | Morris |
| 7,641,513 B2 | 1/2010 | Hoath et al. |
| 7,686,658 B2 | 3/2010 | Clark et al. |
| 7,715,210 B2 | 5/2010 | Clark et al. |
| 7,722,390 B2 | 5/2010 | Debenedictis et al. |
| 7,731,525 B2 | 6/2010 | Hammond, Jr. et al. |
| 7,764,859 B2 | 7/2010 | Krampotich et al. |
| 7,769,266 B2 | 8/2010 | Morris |
| 7,811,122 B2 | 10/2010 | Clark et al. |
| 7,811,123 B2 | 10/2010 | Hoath et al. |
| 7,817,444 B2 | 10/2010 | Dennes |
| 7,873,252 B2 | 1/2011 | Smrha et al. |
| 7,873,253 B2 | 1/2011 | Smrha et al. |
| 2005/0186838 A1 | 8/2005 | Debenedictis et al. |
| 2007/0163801 A1 | 7/2007 | Coffey et al. |
| 2008/0107497 A1 | 5/2008 | Morris |
| 2008/0178014 A1 | 7/2008 | Anderson et al. |
| 2009/0068881 A1 | 3/2009 | Patchett |
| 2009/0176404 A1 | 7/2009 | Follingstad |
| 2009/0214171 A1 | 8/2009 | Coburn et al. |
| 2010/0008059 A1 | 1/2010 | Morris |
| 2010/0080512 A1 | 4/2010 | Taylor et al. |
| 2010/0195969 A1 | 8/2010 | Kennedy et al. |
| 2010/0240251 A1 | 9/2010 | Hammond, Jr. et al. |
| 2010/0316345 A1 | 12/2010 | Wentworth et al. |
| 2010/0316346 A1 | 12/2010 | Krampotich et al. |

\* cited by examiner

CONSOLIDATION POINT ENCLOSURE

This application claims benefit of Ser. No. 2009/200,824, filed 3 Mar. 2009 in Australia and which application is incorporated herein by reference. To the extent appropriate, a claim of priority is made to the above disclosed applications.

TECHNICAL FIELD OF THE INVENTION

The present invention relates to a consolidation point enclosure.

BACKGROUND OF THE INVENTION

For most businesses, it is desirable to have workforce flexibility. The ability to rapidly configure and deploy skill-specific, cross-functional teams enables companies to quickly take advantage of market opportunities. A flexible workforce typically requires a flexible workspace. Modular office layouts have become extremely popular because they are easy to reconfigure to suit the needs of a changing organisation. When teams or departments are re-organised, cubicle walls and furniture are frequently rearranged to meet new layout requirements.

Similarly, there is a necessity to install a structured cabling system that accommodates frequent moves, adds, and changes without having to install new horizontal cables all the way back to a central telecommunications room. This is typically achieved by use of consolidation points. A system designer can provide a consolidation point at location within the horizontal pathway so as to keep reconfiguration of cabling close to the work area. The International Standard ISO/IEC 11801—Telecommunications installations—Generic Cabling for commercial premises standard defines a consolidation point as a:

Connection point in the horizontal cabling subsystem between a floor distributor and a telecommunications outlet.

In order to facilitate frequent moves, adds and changes, consolidation points are typically installed in areas that are easily accessible by technicians. Consolidation points may include, for example, one or more terminal modules seated in an enclosure. This enclosure is mounted to a column or a wall in proximity of the work area. These enclosures serve as a distribution point for telecommunications networks wiring and facilitate moving, adding or changing telecommunications wiring. The term "telecommunications" refers to voice, data, network and other applications and is intended to refer to a wide class of wiring applications and products. Such products include wire managers, outlets, connecting blocks and other components typically used in the telecommunications industry. Wiring and cabling as used herein are intended to refer to a variety of signal carrying devices including, but not limited to, copper wire, optical fibre, coaxial cable, etc.

The interconnection of a consolidation point with the telecommunications room is accomplished, for example, by terminating the telecommunications cables that extend from the telecommunications room with corresponding wire connection locations on terminal blocks of the consolidation point. Similarly, interconnection of the consolidation point with a plurality of work area outlets is achieved, for example, by terminating solid twisted pair cables extending from the back of the work area outlets with corresponding wire connection locations on terminal blocks of the consolidation point.

Conventional consolidation point enclosures suffer from a number of drawbacks. For example, it may be difficult to effect punch down connections of wires into the terminal blocks of the consolidation point to connect works area outlets to the consolidation point. Such connections may be prone to errors and/or ill effected connections. These difficulties may be more apparent when the consolidation point is located in a floor space with little room to properly view and uniquely identify the individual wire connection locations of the terminal blocks.

In order to facilitate frequent moves, adds and changes, the consolidation point are typically installed in an area that is easily accessible by technicians. However, the most suitable location for installation may not lend itself to easy mounting of the consolidation point. For example, it may be desirable to couple the consolidation point be coupled to a post that is narrower than the width of the fastening locations of the consolidation point. Further, it may be necessary to couple the consolidation point to a mesh tray, for example, which is not adapted to receive screws.

In some cases, it is desirable to conceal the consolidation point in a suspended ceiling or a raised floor. Space is often limited in these locations, especially in raised floor applications. Conventional consolidation points may not be suitable for installation in locations with restricted floor or ceiling space.

It is generally desirable to overcome or ameliorate one or more of the above mentioned difficulties, or at least provide a useful alternative.

SUMMARY OF THE INVENTION

In accordance with one aspect of the invention, there is provided a consolidation point enclosure for a telecommunications network, including:

(a) a base member for supporting the consolidation point on a mounting surface; and (b) first and second bracket parts coupled to opposite end sections of a generally planar connection section of the base member, wherein the bracket parts are adapted to couple opposite ends sections of a patch panel to the base member so that a common insertion direction of modular jacks of the patch panel is substantially parallel to the generally planar connection section of the base member.

Preferably, the connection section of the base member is generally rectangular and the first and second bracket parts extend normally out of respective short ends sections of the rectangular planar connection section.

Preferably, a long side of the rectangular connection section of the base member abuts a corresponding section of the patch panel when coupled to the bracket parts.

Preferably, the consolidation point enclosure includes a lid member couplable to the bracket parts.

Preferably, the patch panel is framed by the connection section of the base member, the bracket parts and the lid member.

Preferably, the mounting surface is a floor cavity, a roof cavity, a wall, or a cable tray.

In accordance with another embodiment of the invention, there is provided a consolidation point for a telecommunications network, including the above described consolidation point enclosure coupled to a patch panel.

In accordance with another aspect of the invention, there is provided a method of installing a consolidation point on a mounting surface, including the steps of:

(a) locating a base member of the above described consolidation point enclosure on the mounting surface;

(b) coupling a patch panel to the bracket parts of the enclosure; and (c) coupling the lid member of the enclosure to the bracket parts.

Preferably, the method includes the step of coupling the base member to the mounting surface.

Preferably, the steps are performed in situ.

Preferably, the steps are performed in a floor cavity.

The present invention preferably has a lower profile than known consolidation point enclosures.

The present invention preferably facilitates easy access and makes work area changes as simple as moving or changing consolidation point cable and outlet to a new location and plugging an equipment cord into an outlet.

By use of the present invention, organizations can preferably install cabling systems that allow them to efficiently and cost effectively make moves, adds, and changes.

BRIEF DESCRIPTION OF THE DRAWINGS

Preferred embodiments of the present invention are hereafter described, by way of non-limiting example only, with reference to the accompanying drawing in which.

DETAILED DESCRIPTION OF PREFERRED EMBODIMENTS OF THE INVENTION

Figure 1:
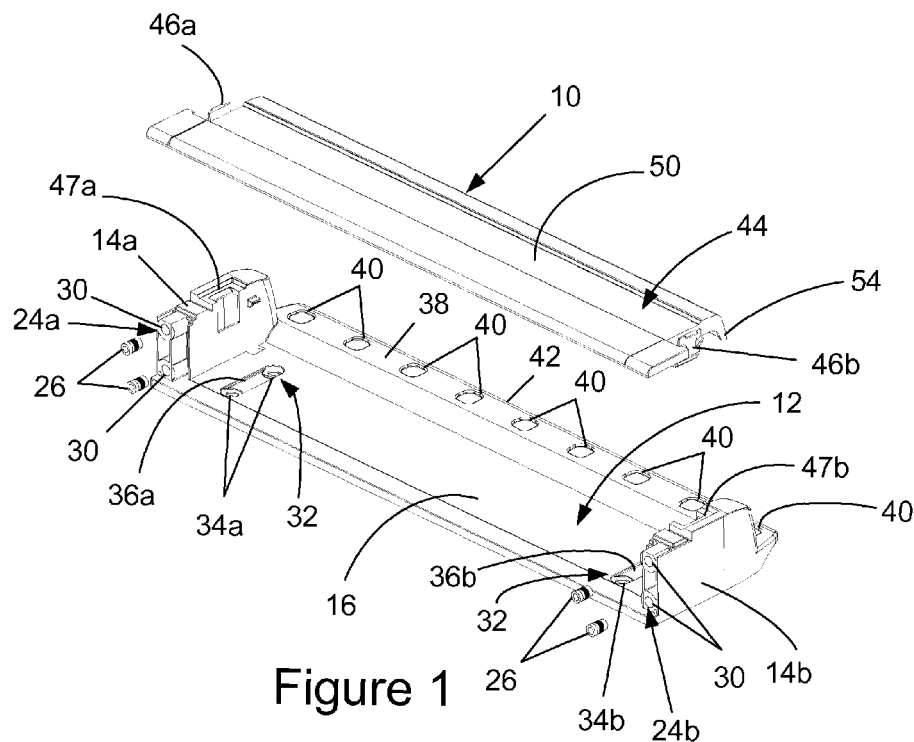
FIG. 1 is a front perspective exploded view of a consolidation point enclosure.
Figure 2:
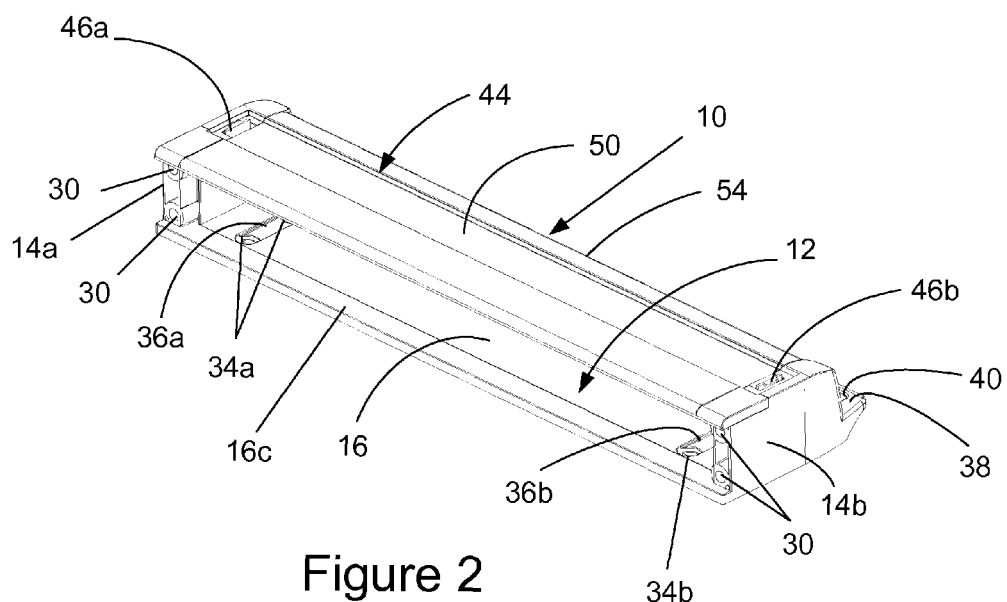
FIG. 2 is a front perspective view of the consolidation point enclosure shown in FIG. 1 arranged in an assembled condition of use.
Figure 3:
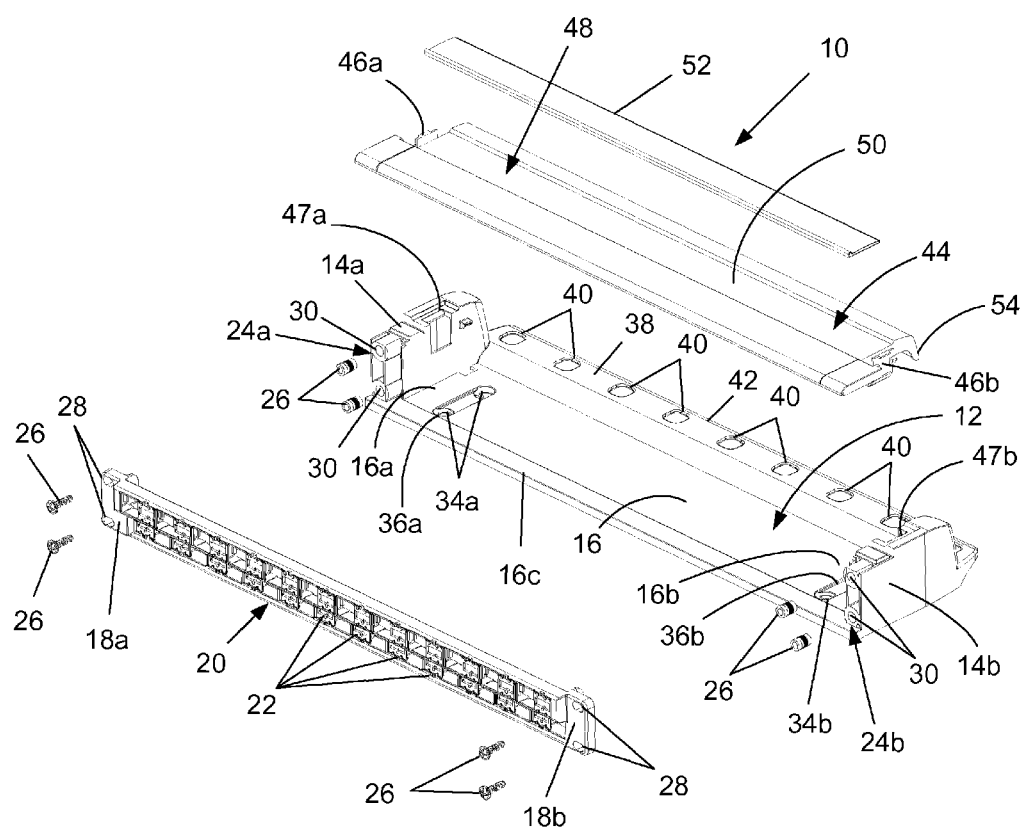
FIG. 3 is a front perspective exploded view of the consolidation point enclosure shown in FIG. 1 and a corresponding patch panel.
Figure 4:
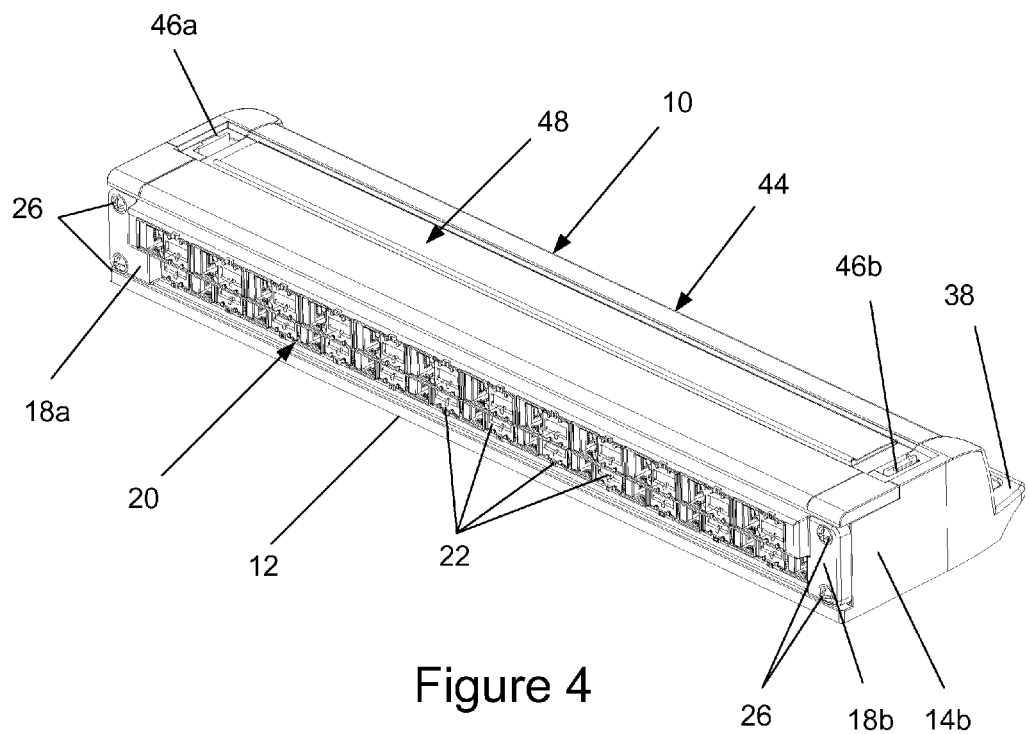
FIG. 4 is a front perspective view of the consolidation point and patch panel shown in FIG. 3 arranged in an assembled condition of use.
Figure 5:
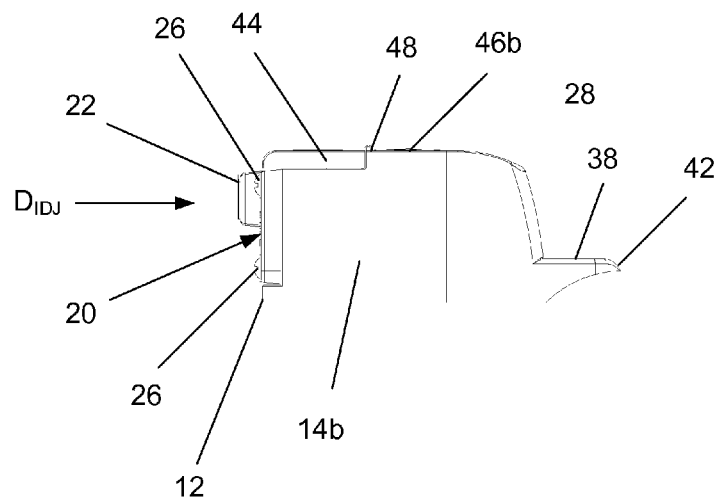
FIG. 5 is a side view of the consolidation point enclosure and patch panel shown in FIG. 4.
Figure 6:
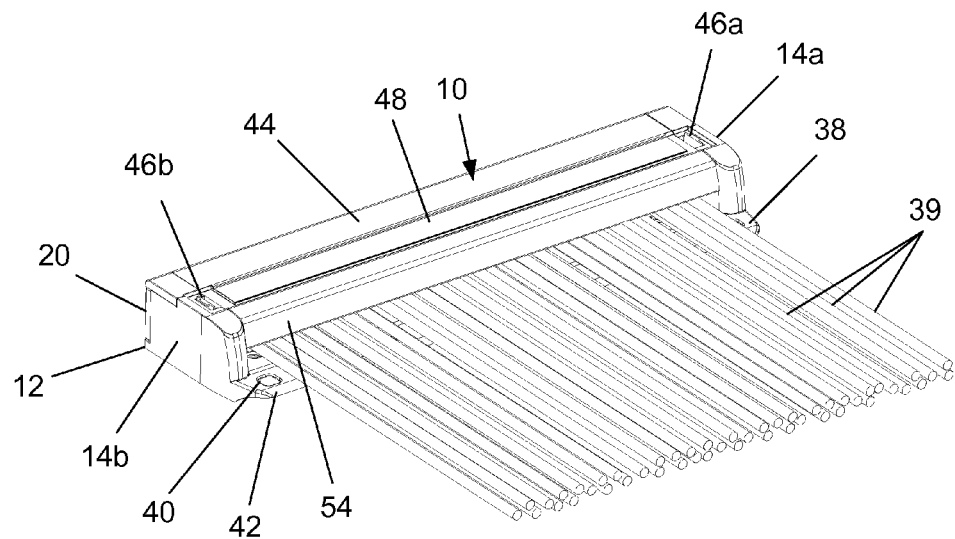
FIG. 6 is a back perspective view of the consolidation point enclosure and patch panel shown in FIG. 4 arranged in another condition of use.

The consolidation point enclosure 10 and patch panel 20 shown in FIGS. 1 to 6 is used in a telecommunications network (not shown) as a location for interconnection between horizontal cables extending from a floor distributor and horizontal cables extending to a telecommunications outlet, for example. The consolidation point enclosure 10 includes a base member 12 for supporting the consolidation point enclosure 10 on a mounting surface (not shown); and first and second bracket parts 14a, 14b coupled to opposite end sections of a generally planar connection section 16 of the base member 12. The bracket parts 14a, 14b are adapted to couple opposite ends sections 18a, 18b of a patch panel 20 to the base member 12 so that a common insertion direction "$D_{IDJ}$" of modular jacks 22 of the patch panel 20 is substantially parallel to the generally planar connection section 16 of the base member 12.

The consolidation point enclosure 10 is suitable for use on many different mounting surfaces including a floor cavity; a roof cavity; a wall; a post; a tray; or any other cable pathway. The consolidation point enclosure 10 can be installed on a mounting surface by performing the steps of:

a. locating the base member 12 on the mounting surface;

b. coupling the base member 12 to the mounting surface;

c. coupling a patch panel 20 to the bracket parts 114a, 114b; and d. coupling the lid member 44 to the bracket parts 114a, 114b.

The above steps are preferably performed in situ. For example, the steps can be performed in a floor cavity where there may not be sufficient space to insert the assembled consolidation point enclosure 10 into the space provided. The consolidation point enclosure 10 can preferably be used in a floor cavity having as little as 50 mm clearance. Alternatively, the consolidation point enclosure 10 can be assembled in an easily accessible adjacent location then the base member 12 can be located and coupled to the mounting surface.

By incorporating the rectangular patch panel 20, the profile of the consolidation point enclosure 10 is reduced and, as such, it can be fitted into floor cavities, for example, with limited space. The consolidation point enclosure 10 is adapted to maintain the desired bend radius on cables upon entering and exiting the patch panel 20. In combination, the consolidation point enclosure 10 and the patch panel 20 preferably have greater density than previous consolidation points that use terminal modules whereby insulated conductors are connected by punch down connections. Also, a person with little technical skill still has the ability to safely make minor changes to the network using the patch panel 20 with modular jacks 22, as opposed to punch down terminations.

The generally planar connection section 16 of the base member 12 is generally rectangular in shape. The first and second bracket parts 14a, 14b extend normally out of respective short ends sections 16a, 16b of the rectangular planar connection section 16. The bracket parts 14a, 14b are preferably formed integrally with the base member 12. The patch panel 20 is preferably rectangular in shape and a long side 16c of the rectangular connection section 16 of the base member 12 abuts a corresponding long side of the rectangular patch panel 20 when coupled to the bracket parts 14a, 14b in the manner shown in FIG. 4.

The bracket parts 14a, 14b include fasteners 24a, 24b for coupling respective end sections 18a, 18b of the patch panel 20 to the base member 12. The fasteners 24a, 24b are screws 26 shaped to extend through apertures 28 in the opposite end sections of the patch panel into corresponding threaded apertures 30 in the bracket parts 14a, 14b. Alternatively, any other suitable fasteners 24a, 24b could be used to couple to the patch panel 20 to the consolidation point enclosure 10.

As particularly shown in FIG. 1, the connection section 16 of the base member 12 includes fastening locations 32 for coupling the consolidation point enclosure 10 to the mounting surface. The fastener locations 32 are located on opposite ends of the connection section 16 and each include a pair of apertures 34a, 34b. The consolidation point enclosure 10 is adapted to be tied to the mounting surface through each pair of apertures 34a, 34b. Each pair of apertures 34a, 34b is set into a common recess 36a, 36b formed in the connection section 16. The fasteners 32 preferably accommodate Velcro™ straps (not shown), or nylon cable ties (not shown), shaped to extend through respective pairs of apertures 34a, 34b to tie the consolidation point enclosure 10, to the mounting surface.

Figure 7:
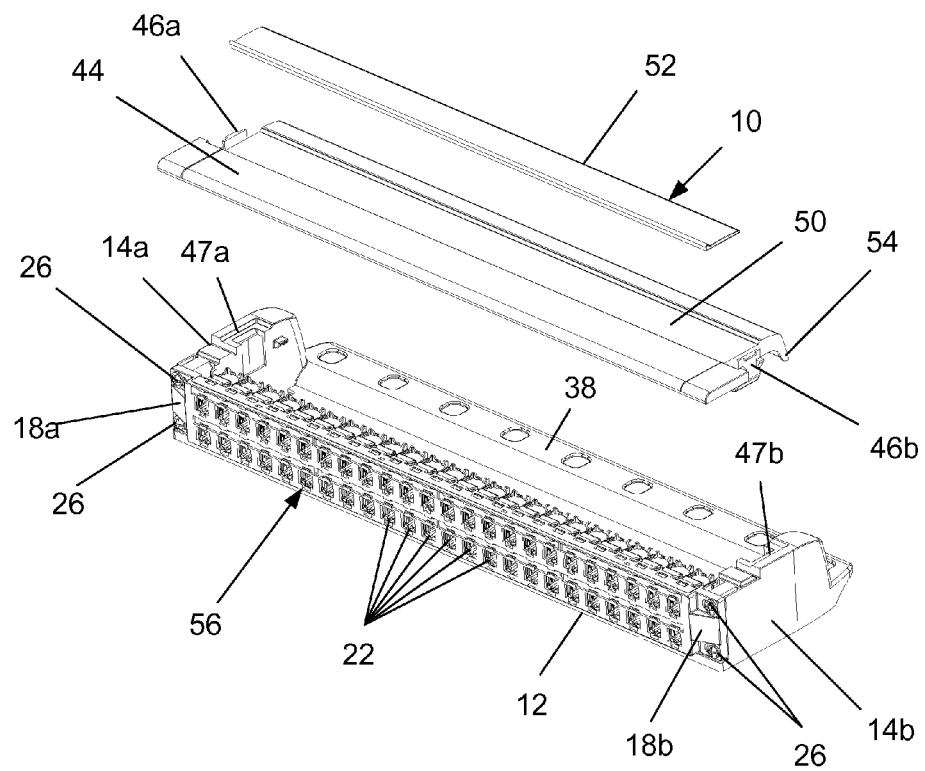
FIG. 7 is a front perspective partially exploded view of the consolidation point enclosure shown in FIG. 1 coupled to another patch panel.
Figure 8:
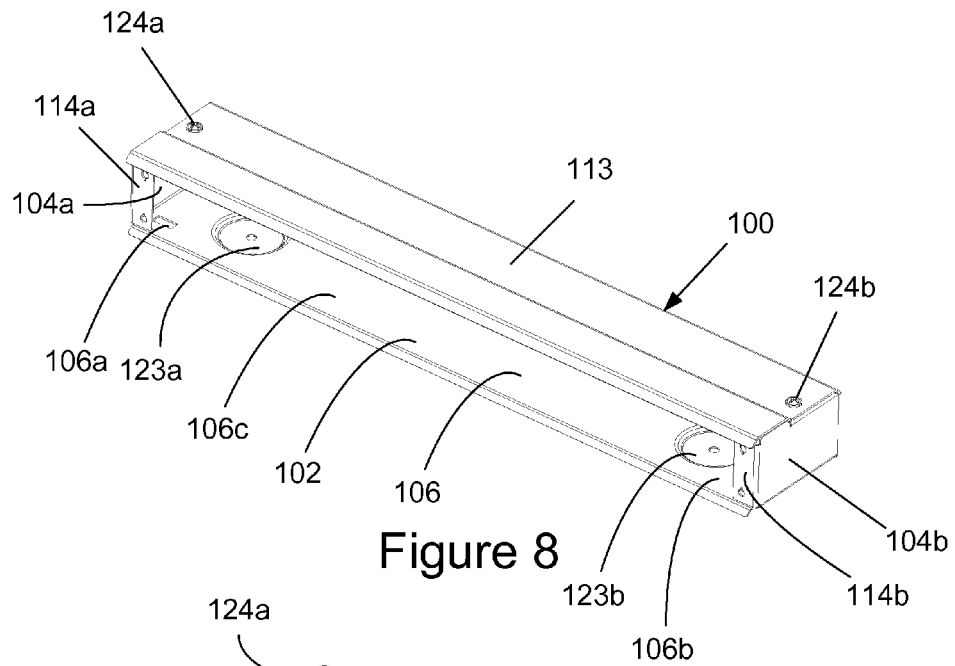
FIG. 8 is a front perspective view of another consolidation point enclosure.

As particularly shown in FIG. 7, the base member 12 includes a cable management section 38. The cable management section 38 is stepped up from the generally planar connection section 16 to reduce bend on cables 39 coupled to and extending from a back side of the patch panel 20. The cable management section 38 includes a plurality of apertures 40 for tying cables 39, coupled to and extending from a back side of the patch panel 20, to the base member 16. The apertures 40 are preferably four sided so that cables 39 can be tied to the base member 16 in two alternate directions. As such, incoming cables 39 can be laid and tied off either perpendicular or adjacent to their termination position. Cables 39 can thereby be laid randomly for optimum C6A performance whilst allowing for suitable anchoring of the bundles. As particularly shown in FIG. 5, an outer peripheral edge section 42 of the cable management section 38 is curved to reduce bend on cables coupled to and extending from a back side of the patch panel 20.

The consolidation point enclosure 10 also includes a lid member 44 couplable to the bracket parts 14a, 14b. As particularly shown in FIG. 3, the patch panel 20 is framed by the connection section 16 of the base member 12, the bracket parts 14a, 14b and the lid member 44. The lid member 44 is generally planar so as to maintain a low profile for the consolidation point enclosure 10. The lid member 44 protects jacks 22 of the patch panel 20 from contaminants such as dust.

The lid member 44 is couplable to the bracket parts 14a, 14b by releasable clips 46a, 46b which are received in corresponding slots 47a, 47b. Access to the patch panel 20 is made easy by the clip on lid 44 that is easily removed while the consolidation point enclosure 10 is coupled to the mounting surface. The clips 46a, 46b are preferably large and easily unclipped. A screwdriver may be placed beside the clips 46a, 46b to unlatch it if extra leverage is required.

The lid member 44 includes a label section 48 for bearing indicia for uniquely identifying jacks 22 of the patch panel 20. The label section 48 includes a recessed section 50 shaped to receive a label plate (not shown) extending between the bracket parts 14a, 14b. The label section 48 includes a transparent label cover 52 shaped to overlie the recessed section 50. As particularly shown in FIGS. 1 and 3, an outer peripheral edge section 54 of the lid member 44 extending between the bracket parts 14a, 14b projects downwardly towards the base member 12. The outer peripheral edge section 54 of the lid member 44 reduces bend on cables extending from a back side of the patch panel 20 where these cables are bent upwards towards the perpendicular.

The consolidation point enclosure 10 is preferably designed to fit in an elevated floor cavity. As such, the standard panel labeling would not be easily read. The label plate is preferably a length of scan strip (supermarket label holder) to so that a full length printed label can be attached if necessary. The label plate is, alternatively, any other self adhesive, non adhesive strip or tape.

The patch panel 20 preferably includes 24 modular jacks 22. Otherwise, the consolidation point enclosure 10 is adapted for use with any other suitable patch panel 20. For example, the consolidation point enclosure 10 can be used with the 48 port patch panel 56 shown in FIG. 7. In this embodiment, the patch panel 56 has up to 48 outlets with cable as large as 8 mm diameter as seen in C6A networks.

The consolidation point enclosure 100 and patch panel 110 shown in FIGS. 8 to 13 is used in a telecommunications network (not shown) as a location for interconnection between horizontal cables extending from a floor distributor and horizontal cables extending to a telecommunications outlet, for example. The consolidation point enclosure 100 includes a base member 102 for supporting the consolidation point enclosure 100 on a mounting surface (not shown); and first and second bracket parts 104a, 104b coupled to opposite end sections of a generally planar connection section 106 of the base member 102. The bracket parts 104a, 104b are adapted to couple opposite ends sections 108a, 108b of a patch panel 110 to the base member 102 so that a common insertion direction "$D_{IDJ}$," of modular jacks 112 of the patch panel 110 is substantially parallel to the generally planar connection section 106 of the base member 102.

The consolidation point enclosure 100 is suitable for use on many different mounting surfaces including a floor cavity; a roof cavity; a wall; a post; a tray; or any other cable pathway. The consolidation point enclosure 100 can be installed on a mounting surface by performing the steps of:

a. locating the base member 102 on the mounting surface;
b. coupling the base member 102 to the mounting surface;
c. coupling a patch panel 110 to the bracket parts 104a, 104b; and
d. coupling the lid member 113 to the bracket parts.

The above steps are preferably performed in situ. For example, the steps can be performed in a floor cavity where there may not be sufficient space to insert the assembled consolidation point enclosure 100 into the space provided. The consolidation point enclosure 100 can preferably be used in a floor cavity having as little as 50 mm clearance. Alternatively, the consolidation point enclosure 100 can be assembled in an easily accessible adjacent location then the base member 102 can be located and coupled to the mounting surface.

By incorporating the rectangular patch panel 110, the profile of the consolidation point enclosure 100 is reduced and, as such, it can be fitted into floor cavities, for example, with limited space. The consolidation point enclosure 100 is adapted to maintain the desired bend radius on cables upon entering and exiting the patch panel 100. In combination, the consolidation point enclosure 100 and the patch panel 110 preferably have greater density than previous consolidation points that use terminal modules whereby insulated conductors are connected by punch down connections. Also, a person with little technical skill still has the ability to safely make minor changes to the network using the patch panel 110 with modular jacks 112, as opposed to punch down terminations.

The generally planar connection section 106 of the base member 102 is generally rectangular in shape. The first and second bracket parts 104a, 104b extend normally out of respective short ends sections 106a, 106b of the rectangular planar connection section 106. The bracket parts 104a, 104b are preferably formed integrally with the base member 102. The patch panel 110 is preferably rectangular in shape and a long side 106c of the rectangular connection section 106 of the base member 102 abuts a corresponding long side of the rectangular patch panel 110 when coupled to the bracket parts 104a, 104b in the manner shown in FIG. 10

The bracket parts 104a, 104b include fasteners 114a, 114b for coupling respective end sections 108a, 108b of the patch panel 110 to the base member 102. The fasteners 114a, 114b include screws (not shown) shaped to extend through apertures in the opposite end sections 108a, 108b of the patch panel 110 into corresponding threaded apertures in the bracket parts 104a, 104b. Alternatively, any other suitable fasteners 114a, 114b could be used to couple to the patch panel 110 to the consolidation point enclosure 100.

Figure 9:
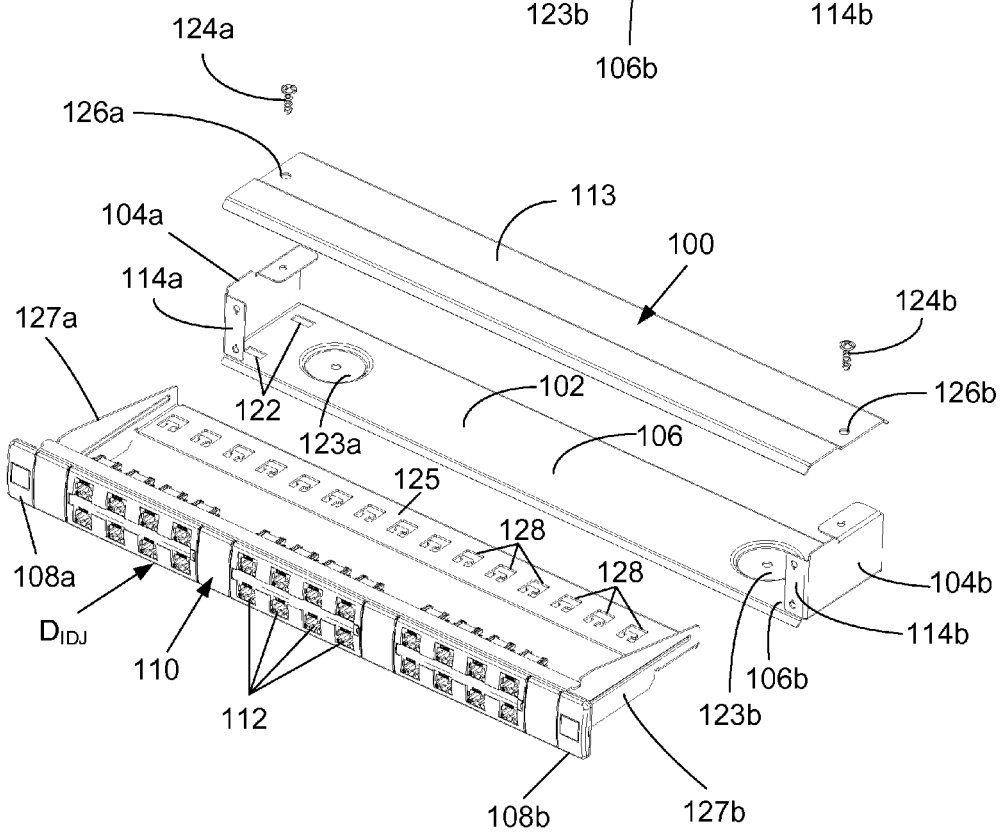
FIG. 9 is a front perspective exploded view of the consolidation point enclosure shown in FIG. 8 and corresponding patch panel.

As particularly shown in FIG. 9, short end sections 106a, 106b of the connection section 106 of the base member 102 include fastening locations 122 for coupling the consolidation point enclosure 100 to the mounting surface. The fastener locations 122 each include a pair of apertures. The consolidation point enclosure 100 is adapted to be tied to the mounting surface through each pair of apertures. The fasteners 122 preferably accommodate Velcro™ straps (not shown), or nylon cable ties (not shown), shaped to extend through respective pairs of apertures to tie the consolidation point enclosure 100, to the mounting surface.

The end sections 106a, 106b of the connection section 106 of the base member 102 also include circular recessed sections 123a, 123b upon which the base member is seated on the mounting surface. The circular recessed sections 123a, 123b include centrally disposed apertures shaped to receive fasteners, such as screws, for coupling the consolidation point enclosure 100 to the mounting surface.

As particularly shown in FIG. 9, the patch panel 110 includes a cable management section 125 coupled to end sections 108a, 108b of the patch panel 110 by brackets 127a, 127b. When the patch panel 110 is fitted to the consolidation point enclosure 100 in the manner shown in FIG. 10, the brackets 127a, 127b support the cable management section 125 in a position stepped up from the generally planar connection section 106. In use, cables extending from a back side of the patch panel 110 overlie the cable management section 125 so as to reduce bend on cables (not shown). The cable management section 125 includes a plurality of apertures 128 for tying cables, coupled to and extending from a back side of the patch panel 110, to the base member 106. The apertures 128 are preferably partially closed by "T" shaped projections to assist in tying down cables to the base member 106. Cables can thereby be laid randomly for optimum C6A performance whilst allowing for suitable anchoring of the bundles. As particularly shown in FIGS. 10 and 12, an outer peripheral edge section 130 of the cable management section 125 is curved to reduce bend on cables coupled to and extending from a back side of the patch panel 110.

The consolidation point enclosure 100 also includes a lid member 113 couplable to the bracket parts 104a, 104b. As particularly shown in FIG. 11, the patch panel 110 is framed by the connection section 106 of the base member 102, the bracket parts 104a, 104b and the lid member 113. The lid member 113 is generally planar so as to maintain a low profile for the consolidation point enclosure 100. The lid member 113 protects jacks 112 of the patch panel 110 from contaminants such as dust.

The lid member 113 is couplable to the bracket parts 104a, 104b by fasteners 124a, 124b which are received in corresponding apertures 126a, 126b. Access to the patch panel 110 is made easy by the removable lid 113 that is easily removed while the consolidation point enclosure 100 is coupled to the mounting surface.

Figure 10:
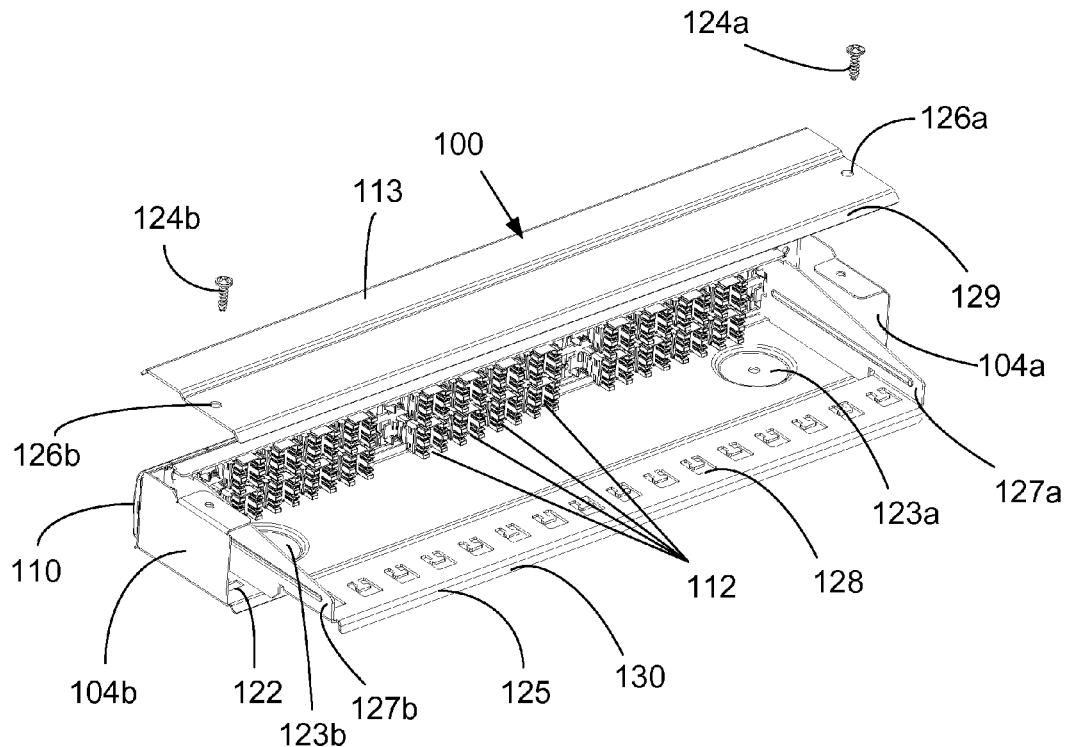
FIG. 10 is a back perspective view of the consolidation point enclosure and patch panel shown in FIG. 9 partly assembled.
Figure 11:
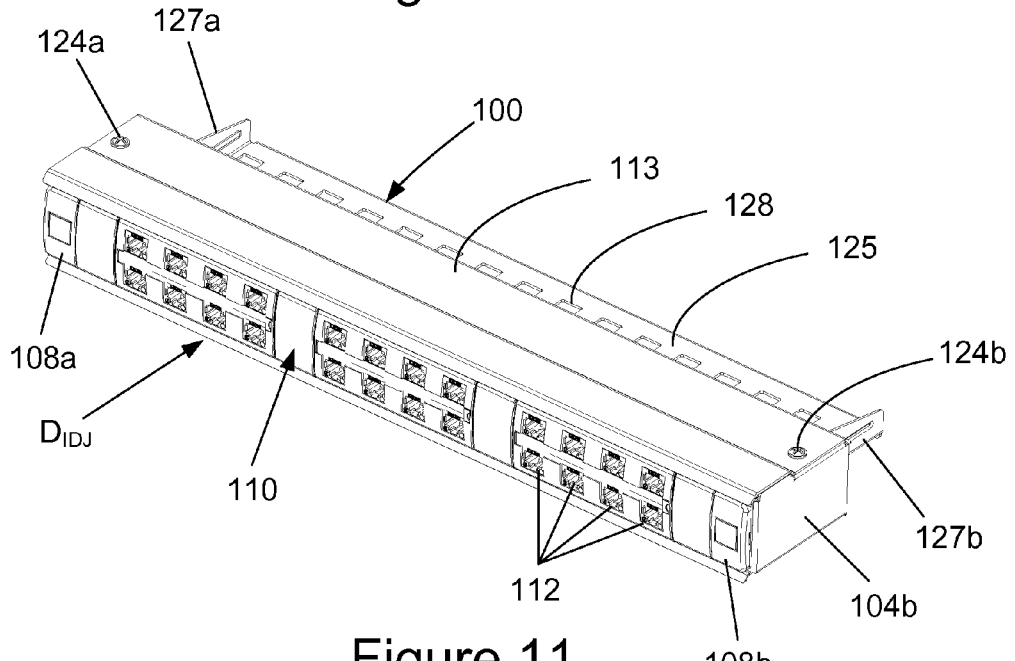
FIG. 11 is a front perspective view of the consolidation point enclosure and patch panel shown in FIG. 9 fully assembled.
Figure 12:
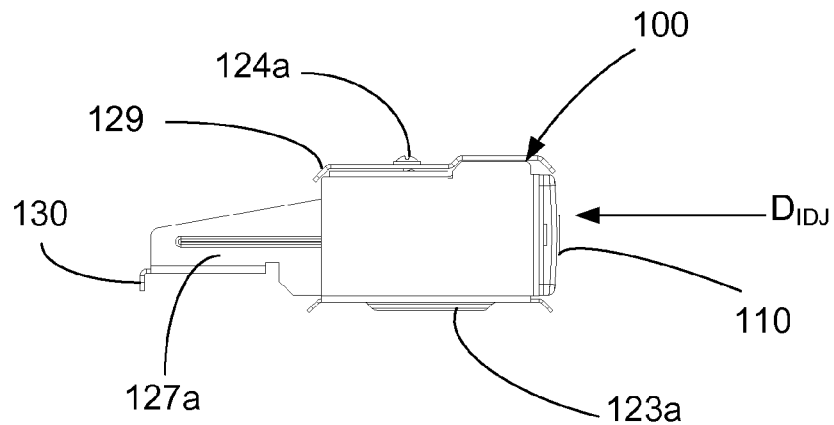
FIG. 12 is a side view of the consolidation point enclosure and patch panel shown in FIG. 11.
Figure 13:
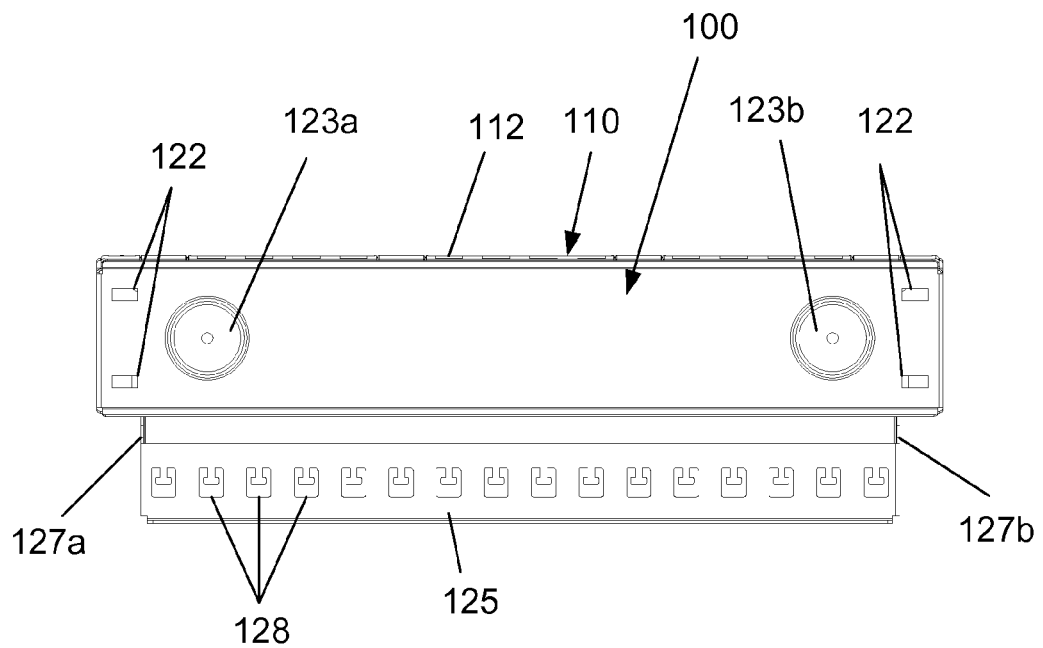
FIG. 13 is a bottom view of the consolidation point enclosure and patch panel shown in FIG. 11.

As particularly shown in FIGS. 10 and 12, an outer peripheral edge section 129 of the lid member 113, extending between the bracket parts 104a, 104b, projects downwardly towards the base member 102.

The outer peripheral edge section 129 of the lid member 113 reduces bend on cables extending from a back side of the patch panel 110 where these cables are bent upwards towards the perpendicular.

The consolidation point enclosure 100 is preferably made of metal. The base member 106 and the brackets 104a, 104b are preferably formed from the same sheet of metal which is pressed to form the shape shown in FIG. 9, for example.

The patch panel 110 preferably includes 24 modular jacks 112. Otherwise, the consolidation point enclosure 100 is adapted for use with any other suitable patch panel 110. For example, the consolidation point enclosure 100 can be used with the 48 port patch panel (not shown). In this embodiment, the patch panel has up to 48 outlets with cable as large as 8 mm diameter as seen in C6A networks.

The consolidation point enclosure 10, 100 and patch panel 20, 110, 56 are adapted to be assembled in situ. For example, the consolidation point enclosure 10, 100 and the patch panel 20, 110, 56 are adapted to be assembled in a floor cavity. The consolidation point enclosure 10, 100 can preferably be used in a floor cavity having 50 mm clearance.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not, and should not be taken as, an acknowledgment or any form of suggestion that the prior art forms part of the common general knowledge in Australia.

LIST OF PARTS

10 Consolidation point enclosure
12 Base member
14a, 14b Bracket part
16 Connection section
16a, 16b End section of connection section
16c Long side of connection section
18a, 18b End section of patch panel
20 Patch panel
22 Modular jack
24a, 24b Fastener
26 Screw
28 Aperture
30 Threaded aperture
32 Fastening location
34a, 34b Pairs of apertures
36a, 36b Common recess
38 Cable management section
39 Cable
40 Apertures
42 Outer peripheral edge section of cable management section
44 Lid member
46a, 46b Resilient clip
47a, 47b Slot
48 Label section
50 Recessed section
52 Label cover
54 Outer peripheral edge section of lid member
100 Consolidation point enclosure
102 Base member
104a, 104b Bracket part
106 Connection section 106a, 106b End section of connection section
106c Long side of connection section
108a, 108b End section of patch panel
110 Patch panel
112 Modular jack
114a, 114b Fastener
122 Fastening location
123a, 123b Circular recessed section
124a, 124b Fastener
125 Cable management section
126a, 126b Apertures
127a, 127b Brackets
128 Apertures
129 Outer peripheral edge section
130 Outer peripheral edge section

The invention claimed is:

1. A consolidation point enclosure for a telecommunications network, comprising:
(a) a base member having a fastening location at which the base member couples to a mounting surface, the base member including a generally planar connection section extending between opposite ends of the base member;
(b) first and second bracket parts coupled to the generally planar connection section of the base member at the opposite ends of the base member; and
(c) a lid member coupled to the first and second bracket parts by releasable clips, the base member, bracket parts, and lid member together forming an open side sized to receive a patch panel;
wherein the bracket parts have fastening sections at which opposite end sections of the patch panel are coupled to attach the patch panel to the base member so that a common insertion direction of modular jacks of the patch panel is substantially parallel to the generally planar connection section of the base member.

2. The consolidation point enclosure claimed in claim 1, wherein the connection section of the base member is generally rectangular and the first and second bracket parts extend normally out of respective short ends sections of the rectangular planar connection section.

3. The consolidation point enclosure claimed in claim 2, wherein a long side of the rectangular connection section of the base member abuts a corresponding section of the patch panel when the patch panel is coupled to the bracket parts.

4. The consolidation point enclosure claimed in claim 1, wherein fasteners extend through the opposite end sections of the patch panel and into fastener apertures defined at the fastening sections of the bracket parts to couple the patch panel to the base member.

5. The consolidation point enclosure claimed in claim 4, wherein the fasteners are screws shaped to extend through apertures in said opposite end sections of the patch panel into corresponding threaded apertures in the bracket parts.

6. The consolidation point enclosure claimed in claim 1, wherein the connection section of the base member includes a fastening location for coupling the consolidation point enclosure to the mounting surface.

7. The consolidation point enclosure claimed in claim 6, wherein the fastening location includes apertures through which a screw can be inserted to couple the consolidation point enclosure to the mounting surface.

8. The consolidation point enclosure claimed in claim 6, wherein the fastening location includes two pairs of apertures located on opposite ends of the connection section, where the consolidation point enclosure is adapted to be tied to the mounting surface through each pair of said pairs of apertures.

9. The consolidation point enclosure claimed in claim 8, wherein each pair of said pairs of apertures is set into a common recess formed in the connection section.

10. The consolidation point enclosure claimed in claim 9, wherein the fastening location is shaped to enable straps to extend through the apertures to tie the consolidation point enclosure to the mounting surface.

11. The consolidation point enclosure claimed in claim 1, wherein the base member includes a cable management section.

12. The consolidation point enclosure claimed in claim 11, wherein the cable management section is stepped up from the generally planar connection section to reduce bend on cables coupled to and extending from a back side of the patch panel.

13. The consolidation point enclosure claimed in claim 11, wherein the cable management section includes a plurality of apertures for tying cables, coupled to and extending from a back side of the patch panel, to the base member.

14. The consolidation point enclosure claimed in claim 13, wherein the apertures are four sided so that cables can be tied to the base member in two alternate directions.

15. The consolidation point enclosure claimed in claim 1, wherein an outer peripheral edge section of the cable management section is curved to reduce bend on cables coupled to and extending from a back side of the patch panel.

16. The consolidation point enclosure claimed in claim 1, wherein the patch panel is framed by the connection section of the base member, the bracket parts and the lid member.

17. The consolidation point enclosure claimed in claim 1, wherein the lid member protects jacks of the patch panel from contaminants.

18. The consolidation point enclosure claimed in claim 1, wherein the lid member includes a label section for bearing indicia for uniquely identifying jacks of the patch panel.

19. The consolidation point enclosure claimed in claim 18, wherein the label section includes a recessed section shaped to receive a label plate extending between the bracket parts.

20. The consolidation point enclosure claimed in claim 19, wherein the label section includes a transparent label cover shaped to overlie the recessed section.

21. The consolidation point enclosure claimed in claim 1, wherein an outer peripheral edge section of the lid member extending between the bracket parts projects towards the base member.

22. The consolidation point enclosure claimed in claim 21, wherein the outer peripheral edge section of the lid member so as to reduce bend on cables extending from a back side of the patch panel.

23. The consolidation point enclosure claimed in claim 1, wherein the bracket parts are formed integrally with the base member.

24. The consolidation point enclosure claimed in claim 1, wherein the patch panel includes 24 modular jacks.

25. The consolidation point enclosure claimed in claim 1, wherein the patch panel includes 48 modular jacks.

26. The consolidation point enclosure claimed in claim 1, wherein the base member is configured to support the consolidation point enclosure at a floor cavity.

27. The consolidation point enclosure claimed in claim 1, wherein the base member is configured to support the consolidation point enclosure at a roof cavity.

28. The consolidation point enclosure claimed in claim 1, wherein the base member is configured to support the consolidation point enclosure at a wall.

29. The consolidation point enclosure claimed in claim 1, wherein the base member is configured to support the consolidation point enclosure at a tray.

30. The consolidation point enclosure claimed in claim 1, a patch panel coupled thereto.

31. The consolidation point enclosure claimed in claim 30, wherein the consolidation point enclosure and patch panel are adapted to be assembled in situ.

32. The consolidation point enclosure claimed in claim 31, wherein the consolidation point enclosure and the patch panel are adapted to be assembled in a floor cavity.

33. The consolidation point enclosure claimed in claim 31, wherein the consolidation point enclosure and the patch panel are adapted to be assembled in a floor cavity has as little as 50 mm clearance.

34. A consolidation point enclosure for a telecommunications network, comprising:
   (a) a base member having a fastening location at which the base member couples to a mounting surface, the base member including a generally planar connection section extending between opposite ends of the base member;
   (b) first and second bracket parts coupled to the generally planar connection section of the base member at the opposite ends of the base member; and
   (c) a lid member coupled to the first and second bracket parts, wherein the lid member includes a label section for bearing indicia for uniquely identifying jacks of the patch panel;
   wherein the bracket parts have fastening sections at which opposite end sections of the patch panel are coupled to attach the patch panel to the base member so that a common insertion direction of modular jacks of the patch panel is substantially parallel to the generally planar connection section of the base member.

35. The consolidation point enclosure claimed in claim 34, wherein the label section includes a transparent label cover shaped to overlie the recessed section.

36. A consolidation point enclosure for a telecommunications network, comprising:
   (a) a base member having a fastening location at which the base member couples to a mounting surface, the base member including a generally planar connection section extending between opposite ends of the base member;
   (b) first and second bracket parts coupled to the generally planar connection section of the base member at the opposite ends of the base member; and
   (c) a lid member coupled to the first and second bracket parts, wherein an outer peripheral edge section of the lid member extends between the bracket parts projects towards the base member;
   wherein the bracket parts have fastening sections at which opposite end sections of the patch panel are coupled to attach the patch panel to the base member so that a common insertion direction of modular jacks of the patch panel is substantially parallel to the generally planar connection section of the base member.

37. The consolidation point enclosure claimed in claim 36, wherein the outer peripheral edge section of the lid member so as to reduce bend on cables extending from a back side of the patch panel.

\* \* \* \* \*